United States Patent Office 3,123,530
Patented Mar. 3, 1964

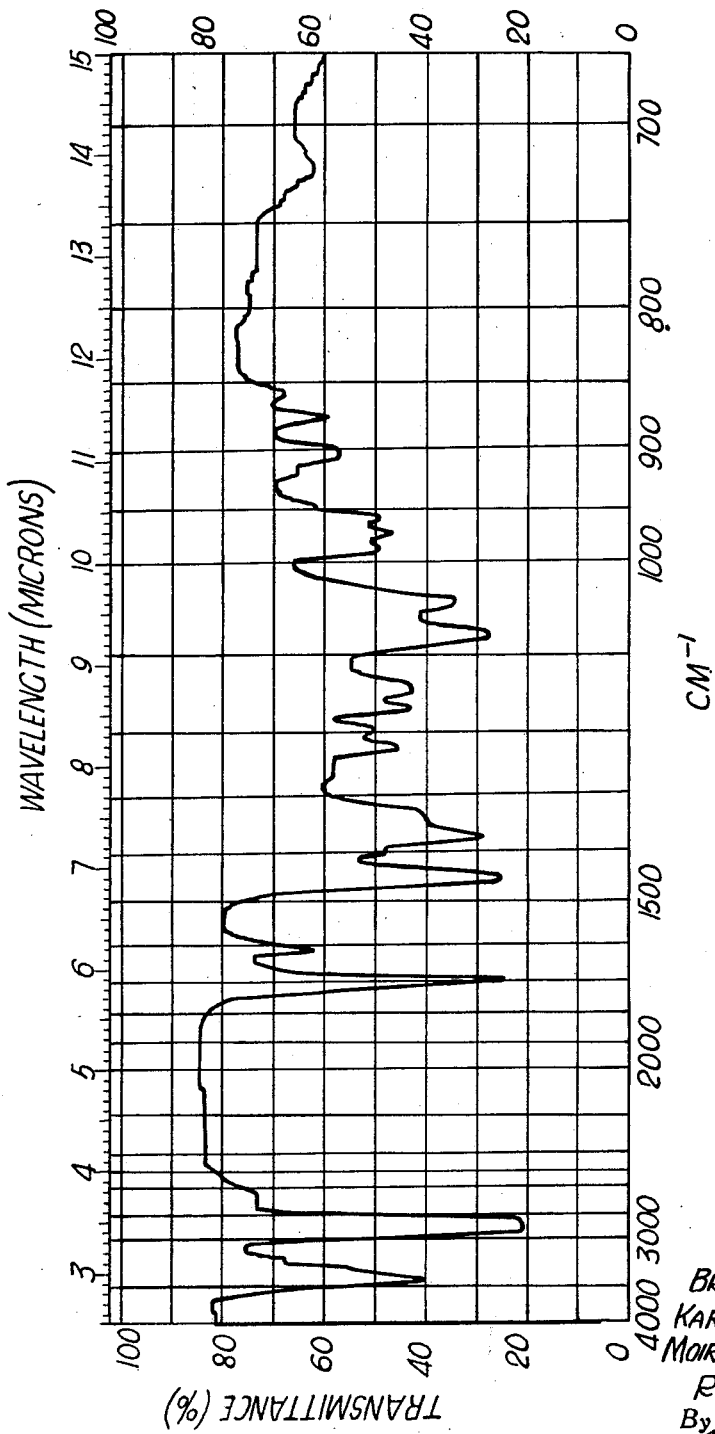

3,123,530
ANTIBIOTIC AA368 AND METHOD OF PRODUCTION
Alan Rhodes, Bracknell, Brian Boothroyd, Beaconsfield, Karl Heinz Fantes, Bushey, Moira Patricia McGonagle, Slough, and Rodger Crosse, Stoke Poges, near Slough, England, assignors to Glaxo Group Limited, Greenford, England, a British company
Filed Sept. 25, 1961, Ser. No. 140,351
Claims priority, application Great Britain Sept. 23, 1960
30 Claims. (Cl. 167—65)

The present invention is concerned with a new antibiotic, and the production thereof. More particularly it relates to a new antibiotic which we have designated AA368 (by which name it will be referred to hereinafter). The antibiotic has been alternatively designated "venturicidin."

The new antibiotic AA368 may be obtained from a number of Streptomyces species which appear to fall into three groups. Cultures of these organisms are available from us upon request.

The invention will now be described from the following four main aspects, namely:
(1) The characteristics and properties of the new antibiotic AA368;
(2) The characteristics of the AA368-producing organisms;
(3) The cultivation of AA368-producing organisms for the production of the antibiotic;
(4) The isolation and purification of AA368, and preparation of compositions containing it.

(1) THE CHARACTERISTICS AND PROPERTIES OF AA368

(i) Physical Properties

The following physical properties have been determined upon the purest material so far obtained.

AA368 may be obtained as a crystalline material having a melting-point (uncorrected) of 140–142° C. upon recrystallisation from ethyl acetate/petroleum ether (1:3 by volume). The substance has a specific rotation of $[\alpha]_D^{20} = +114°$ (c., 1% in chloroform). Upon analysis sulphur and halogens were found to be absent, while microanalysis of AA368 gave the approximate values of C=64.89, H=8.95%, and N=1.75%. Molecular weight determinations by the Rast method gave values of 633 and 712. This analysis would correspond with the formula $C_{43}H_{71}O_{12}N$, molecular weight=793.

The ultra-violet spectrum of a solution of AA368 in methanol showed peaks at 280 mμ and at 200 mμ. Infrared analysis indicated the presence of two carbonyl groups in the AA368 molecule together with two double bonds, which are possibly aromatic. The infra-red adsorption spectrum of a Nujol mull of AA368 is as shown in the accompanying drawing and possesses the following principal bands: 3450 (2.90μ), 3220 (3.11μ), 1712 (5.84μ), 1624 (6.16μ), 1466 (6.82μ), 1410 (7.09μ), 1384 (7.22μ), 1328 (7.53μ), 1274 (7.85μ), 1258 (7.95μ), 1230 (8.13μ), 1208 (8.28μ), 1174 (8.52μ), 1150 (8.70μ), 1082 (9.24μ), 1046 (9.56μ), 990 (10.10μ), 972 (10.29μ), 960 (10.24μ), 920 (10.87μ), 904 (11.06μ), 876 (11.42μ), 860 (11.63μ), 828 (12.08μ), 800 (12.50μ) and 778 cm.$^{-1}$ (12.85μ).

(ii) Chemical Properties

AA368 is a neutral substance, soluble in butanol, ethyl acetate and chloroform. In aqueous suspension it is stable at room temperature, at a pH of 7. The antibiotic gave a red colouration with 2,4-dinitrophenylhydrazine, but did not reduce ammoniacal silver nitrate, or give a colouration in the ferric chloride, dianisidine and anthrone tests.

(iii) Biological Activity of Antibiotic AA368

Crystalline AA368 possesses valuable antifungal properties being apparently "fungistatic" rather than "fungicidal" but does not appear to possess significant antibacterial activity.

The microbiological spectrum of AA368 was determined with reference to the minimum concentration required to produce inhibition zones in cup plate assays. The results were as follows.

| Species: | Minimal inhibitory concentration in μg./ml. |
|---|---|
| Cercospora melonis | 1.25 |
| Phoma betae | 5.0 |
| Thielaviopsis basicola | 20.0 |
| Tricothecium roseum | 5.0 |
| Glomerella cingulata | 10.0 |
| Aspergillus niger | 5.0 |
| Alternaria tenuis | 5.0 |
| Didymella lycopersici | 2.5 |
| Botrytis cinerea | 2.5 |
| Ascochyta pisi | 40.0 |
| Pythium debaryanum | 5.0 |
| Penicillium expansum | 10.0 |
| Ustilago maydis | 5.0 |
| Verticillium albo-atrum | 2.5 |
| Helminthosporium avenae | 2.5 |
| Fusarium nivale | 2.5 |
| Saccharomyces cerevisiae<br>Sclerotinia sclerotiorum<br>Candida albicans<br>Exobasidium vexans | No zone at 40 μg./ml. |

Further in vitro tests were conducted by the tube dilution assay method, in which the antibiotic was incorporated in agar and the test fungus inoculated on the surface of the agar slope. The following results were obtained at the stated concentrations of antibiotic:

Venturia inaequalis—total inhibition at 0.98 μg./ml.; almost total inhibition at 0.33 μg./ml.; partial inhibition to 0.11 μg./ml.
Phytophthora infestans—total inhibition to approx. 9 μg./ml.
Botrytis cinerea and Sclerotinia fructigens—total inhibition down to at least 0.31 μg./ml.
Aspergillus niger, Glomerella cingulata, Cercospora melonis and Fusarium nivale—marked inhibition of growth down to 0.31 μg./ml.
Thielaviopsis basicola—slight activity.
Aspergillus fumigatus—part inhibition of growth at concentrations between 20 μg./ml. and 1.25 μg./ml.

In addition to the above in vitro tests, AA368 was submitted to invivo greenhouse antifungal protection tests against a number of plant pathogens, as follows:

Apple scab (Venturia inaequalis): 20 μg./ml. crystalline AA368 gave protection approximately equal to that of 200 μg./ml. captan active ingredient.
Barley mildew (Erysiphe graminis): 20 μg./ml. crystalline AA368 gave protection equal to that of 250 μg./ml. karathane active ingredient.
Apple mildew (Podosphaera leucotricha): 10 μg./ml. crystalline solid gave approximately 50% reduction in disease.
Botrytis cinerea on tomatoes. 20 μg./ml. AA368 gave approximately 50–78% disease reduction.
Botrytis cinerea on vine. 20 μg./ml. AA368 gave 70–85% reduction in disease.

In small plot field trials 40 μg./ml. of crystalline AA368 caused approximately 66% reduction of apple scab.

In large scale trials 200 and 100 μg./ml. AA368 as miscible formulations gave commercially acceptable protection against apple scab (*Venturia inaequalis*) on Cox's Orange Pippin, equivalent to that obtained with 0.1% captan active ingredient (as wettable powder).

In none of the above tests did the antibiotic AA368 shows phytotoxicity, so that it may be concluded that the antibiotic is substantially non-phytotoxic.

The toxicity of AA368 to mammals was examined with respect to mice. Aqueous suspensions of AA368 were tested for acute toxicity by the intravenous and intraperitoneal routes in male mice of the G.F.F. strain (body weight range 16–22 g.). Mortalities were recorded four days after intravenous administration and seven days after intraperitoneal administration. The results are shown in the following tables:

RESULTS

| Route | Suspension concentration, w./v. | Dose mg./20 g. | Dose mg./kg. | No. of deaths/ No. of mice dosed | $LD_{50}$, mg./kg. |
|---|---|---|---|---|---|
| Intravenous | 0.1 | 0.24 | 12 | 1/5 | 20 |
|  |  | 0.3 | 15 | 0/5 |  |
|  |  | 0.36 | 18 | 3/5 |  |
|  |  | 0.4 | 20 | 2/5 |  |
|  |  | 0.46 | 23 | 5/5 |  |
| Intraperitoneal | 0.25 | 0.05 | 6.25 | 0/1 | 400 |
|  |  | 0.1 | 12.5 | 0/1 |  |
|  |  | 0.2 | 25 | 0/1 |  |
|  |  | 0.4 | 50 | 0/1 |  |
|  |  | 0.8 | 100 | 0/1 |  |
|  |  | 0.9 | 112 | 0/1 |  |
|  | 1.0 | 0.4 | 200 | 0/1 |  |
|  |  | 0.8 | 400 | 0/1 |  |

It is therefore apparent that AA368 in mice has an $LD_{50}$ (intravenous) of 20 mg./kg. and that AA368 showed no deaths at the maximum dose equivalent to 400 mg. of AA368 per kilogram (intraperitoneal).

(2) THE CHARACTERISTICS OF THE AA368-PRODUCING ORGANISMS

A number of Streptomyces strains have been found by us to produce the new antibiotic AA368. They have been isolated from soil samples, and appear to fall into three species having a general resemblance to *S. griseolus*, *S. xanthopaeus*, or *S. halstedii*, but can be distinguished from *S. halstedii* by failure to grow at 37° C., as follows.

*Species A.*—This comprises a strain of Streptomyces given in general characterised by the following morphological features:

Chick-pea agar: Vegetative mycelium: White tinged grey. Aerial mycelium milk-white. Reverse of vegetative mycelium grey-black. No soluble pigment produced. Colony rough. Odour earthy.
Potato dextrose agar: Vegetative mycelium: mustard yellow. Aerial mycelium grey white. Reverse of vegetative mycelium mustard yellow. Yellow-brown soluble pigment produced. Colony rought. Odour musty.
Calcium gluconate agar: Vegetative mycelium white-grey. Aerial mycelium chalk-white. Colony matt. Odour earthy.
Sucrose agar: Vegetative mycelium white-grey.
Palm-oil agar: Vegetative mycelium ash-grey. Colony matt. Odour earthy.
Glucose-agar: Vegetative mycelium white-grey. Aerial mycelium grey-white.
Raffinose agar: No growth.
Cellulose agar: No growth.
Starch hydrolysis test gave hydrolysis.
Peptonization test: Peptonization on litmus milk.

A strain of this species has been deposited at the National Collection of Industrial Bacteria, Aberdeen, and designated N.C.I.B. 9199. This species will be designated Streptomyces N.C.I.B. 9199.

*Species B*—This species is characterised by the following morphological features:

Potato dextrose agar: Vegetative mycelium green-grey Aerial mycelium green-grey. Colony type smooth. Odour earth and sweet. No soluble pigment produced.
Chick-pea agar: Vegetative mycelium charcoal-grey. Aerial mycelium ash-grey. Reverse of vegetative mycelium charcoal-grey. Grey-black soluble pigment produced. Colony matt or rough. Odour musty.
Oatmeal agar: Vegetative mycelium ash grey. Aerial vegetative mycelium green-grey. Colony smooth or matt. Odour musty or fruity.

A strain of this species hase been deposited at the National Collection of Industrial Bacteria, and designated N.C.I.B 9200. This species will be designated Streptomyces N.C.I.B. 9200.

*Species C.*—Five strains have been identified in this species. One such strain has been characterised by the Central bureau voor Schimmel Cultures at Baarn, Holland as follows:

Morphology (on starch agar after 10 days): Sporulating filaments sympodially branched, irregularly undulated with a tendency to produce short spirals (on oatmeal agar some short spirals were observed). Spores short cylindrical, rounding up a little after separation, 1.5–2.2 x 1.0–1.3μ. Vegetative hyphae 0.3–0.7μ thick, much branched.

Cultural characters:

Glucose-nitrate agar (10 days): Growth abundant. Colony spreading, slightly raised, bumpy, cracked at the bottom of the tube, yellowish grey. Reverse brownish yellow, after 15 days pale brown. Aerial mycelium fairly abundant, white-velvety and pale grey-powdery-velvety. Soluble pigment pale brown.
Tyrosine agar (10 days): Growth fair. Colony small, slightly raised, circular, pale grey. Reverse pinkish grey. Aerial mycelium after 15 days scant, very thin, white, velvety. Soluble pigment pinkish grey.
Glucose-separagine agar (10 days): Growth abundant. Colony spreading, slightly bumpy at some places, greyish yellow. Reverse greyish straw-yellow with dark grey circular blots. Aerial mycelium abundant, white to pale grey, powdery. Soluble pigment pale greyish brown.
Glycerine-glycocoll agar (10 days): Growth abundant. Colony raised, bumpy, greyish yellow. Reverse yellowish grey and dark brown, after 15 days greyish salmon with brownish black spots and rings. Aerial mycelium fairly abundant, thin, greyish, powdery-velvety, with white, velvety margin. Soluble pigment pale reddish grey-brown.
Oatmeal agar (10 days): Growth abundant. Colony spreading, yellowish-grey. Reverse greyish-yellow, yellowish-grey and dark grey. Aerial mycelium very abundant, powdery-velvety, grey, with small, velvety, greyish-white tufts. Soluble pigment grey.
Czapek+saccharose agar (10 days): Growth fairly abundant. Colony chiefly in the agar, pale grey, after 20 days deep dark grey. Reverse pale grey, after 20 days dark grey. Aerial mycelium abundant, very thin, powdery, greyish white. Soluble pigment absent.
Czapek+glucose agar (10 days): Growth abundant. Colony slightly raised, irregularly bumpy and cerebriform, yellowish grey, becoming greyish yellow in raised parts. Reverse pale pinkish grey-brown with narrow, deep greyish-brown margin, after 15 days brown with dark grey margin. Aerial mycelium abundant, velvety-powdery, white, with narrow grey margin, excreting clear pale yellowish brown droplets, after 20 days almost entirely grey-powdery.
Ca-malate agar+glyc. (10 days): Growth abundant. Colony spreading, slightly raised, a little bumpy, greyish-yellow. Reverse pale lemon-yellow, after 15 days pale greenish straw-yellow. Aerial mycelium abundant, velvety-powdery, white, pale grey and grey. Soluble pigment very pale lemon-yellow.

Potato plug (10 days): Growth abundant. Colony raised, bumpy, becoming cerebriform, yellowish-grey and greyish-yellow. Reverse not visible. Aerial mycelium abundant, but thin, white, velvety. Colour of plug greyish brown.

Emerson agar (10 days): Growth abundant. Colony minutely bumpy and cerebriform, greyish yellow and yellowish grey. Reverse olive-coloured yellowish brown, after 20 days raw umber. Aerial mycelium abundant, thin, white-velvety. Soluble pigment raw umber.

Brain heart infusion agar (10 days): Growth abundant. Colony slightly raised, with irregular, shallow grooves, cerebriform at the bottom of the tube, yellowish grey, greyish yellow in raised parts. Reverse ocry-yellow. Aerial mycelium abundant, very thin, white-velvety. Soluble pigment very pale yellowish brown.

Nutrient agar+glycerine (10 days): Growth abundant. Colony irregularly grooved and cerebriform, yellowish grey and greyish-yellow. Reverse raw umber. Aerial mycelium abundant, thin, white or greyish-white, velvety, excreting amber-yellow droplets. Soluble pigment dark raw umber brown.

Nutrient agar without glycerine (10 days): Growth abundant. Colony slightly raised, spreading, cerebriform at the bottom of the tube, yellowish grey. Reverse olive-yellow. Aerial mycelium abundant, thin, velvety, greyish-white. Soluble pigment absent.

Tryptone agar (2–4 dg.): Melanoid pigment absent.

Iron-peptone agar (2–4 dg.): No $H_2S$— production.

Gelatine-broth (10 days): Growth moderate. Colony as a number of small flakes in the liquefied gelatine, yellowish-grey. Reverse yellowish-grey. Aerial mycelium absent, after 20 days scant, white, powdery-velvety. Liquefaction fairly rapid. Soluble pigment absent.

2% agar (10 days): Growth slow, restricted. Colony spreading, mainly submerged in the agar, pale grey. Reverse pale grey. Aerial mycelium absent. Soluble pigment absent.

Litmus milk (10 days):Greyish white to greyish yellow ring on surface. Coagulation may be present or absent. Peptonization beginning. No change of colour of the milk. The peptonization is completed after 22 days. Peptonized milk pale chestnut brown. Small flakes of the colony after 50 days at the bottom of the tube.

Starch agar (10 days): Growth abundant. Colony spreading, slightly raised in the centre, greyish yellow. Reverse grey with straw-yellow spots and margin. Aerial mycelium abundant, powdery and powdery-velvety, grey with white, velvety patches. Diast. action good.

Glycerine-asparagine agar (10 days): Growth abundant. Colony spreading, slightly raised in the centre, yellowish grey. Reverse straw-yellow and grey. Aerial mycelium abundant greyish-white and pale grey, powdery-velvety.

Glycerine-$KNO_3$ agar (10 days): Growth fairly rapid. Colony spreading, small, circular, slightly bumpy, greyish-yellow. Reverse straw-yellow with yellowish brown centre. Aerial mycelium abundant, powdery, pale grey with paler margin. Soluble pigment pale brownish red-grey, after 20 days pale brown-grey.

Sodium-nitrate agar (10 days): Growth abundant. Single colonies slightly raised in the centre, contacting each other to form a slightly bumpy, pale grey and yellowish-grey colony. Reverse yellowish-grey. Aerial mycelium greyish-white to light grey, powdery-velvety. Soluble pigment absent.

Sabouraud-glucose agar (10 days): Growth abundant. Colony slightly raised, bumpy, becoming cerebriform at the bottom of the tube, cracking on the folds, greyish yellow. Reverse pale yellowish brown, after 15 days organce brown. Aerial mycelium abundant, white, velvety, after 15 days, with small, pale grey, powdery patches. Soluble pigment pale brown.

Sabouraud maltose agar (10 days): Growth abundant. Colony slightly raised and bumpy, yellowish grey. Reverse pale yellowish-brown. Aerial mycelium fairly abundant, white velvety. Soluble pigment pale brown.

Potato-glucose agar (10 days): Growth abundant. Colony spreading, slightly raised, pale grey. Reverse yellowish grey with dark grey patches. Aerial mycelium abundant, ash-grey with small, pale grey, velvety tufts. Soluble pigment absent, after 15 days a trace of light greyish green pigment.

Glucose-broth (10 days): Growth moderate. Small yellowish-grey flakes in the solution, some flat colonies at the surface with thin, white, velvety aerial mycelium. After 20 days growth fairly good, with yellowish-white aerial mycelium. Soluble pigment absent.

A culture from this species has been deposited with the National Collection of Industrial Bacteria, and designated N.C.I.B. 9198. This species will be designated Streptomyces N.C.I.B. 9198.

(3) THE CULTIVATION OF AA368-PRODUCING ORGANISMS

AA368 is produced by the aerobic culture of the various strains of Streptomyces described above.

Suitable culture media are those generally used for culture of moulds of the genus Streptomyces, and should generally contain one or more assimilable sources of nitrogen, an assimilable source of carbon and energy, and nutrient salts. The culture is preferably conducted under submerged aerobic conditions.

The source of nitrogen may be inorganic in character, but is preferably in the form of complex organic material such as oatmeal, peptone, soya meal, maize meal, corn steep liquor, meat extract or a casein digest. Preferably the medium contains from 0.025 to 0.3% of assimilable nitrogen. The source of carbon and energy may for example be a carbohydrate assimilable by the organism, for example, glucose, dextrose, lactose and starch. Such compounds may be already present in the nitrogen source or may be added to the culture media separately. A suitable carbohydrate concentration in the medium is from 0.5% to 7.5%.

Glyceride oils of animal or vegetable origin such as whale oil and maize oil have also proved beneficial.

The fermentation medium is preferably adjusted to a pH between 6 and 7.5, preferably pH 6.8, before inoculation, conveniently by the addition of chalk. The fermentation is conveniently effected at 25–30° C., e.g. at 28° C. Anti-foam agents may be used if necessary.

We have found an oatmeal fermentation medium, containing dextrose or glucose, chalk and whale oil or maize oil to be particularly suitable for the production of AA368. When oils are used they are preferably present in an amount of from 0.25% to 5%.

In general substantial production of the antibiotic takes place after some 48 hours, a convenient harvest time being 96 to 160 hours.

It is generally desirable to inoculate the fermentation medium with vigorously growing vegetative mycelium which has been developed in separate seed and development stages, a suitable medium for such stages containing for example malt extract, glucose and peptone.

(4) THE ISOLATION AND PURIFICATION OF AA368

The new antibiotic AA368 is contained in the mycelium in the harvest broth. Thus the mycelium may be filtered off from the broth, and the antibiotic extracted with a suitable solvent, for example acetone, butanol, ethyl acetate, butyl acetate and amyl acetate. The solvent is then removed, for example by concentration in vacuo, some water being added as necessary. The aqueous solution of AA368 is then extracted once more with a water immiscible organic solvent, e.g., a hydrocarbon solvent such as petrol to extract any antifoam oils present; sometimes (particularly when there is a high level of such oils) the antibiotic itself may also be extracted into the organic solvent layer. In any case, to separate such antibiotic as is contained in this organic solvent, it is preferably extracted with an aqueous organic solvent for the antibiotic, for example with 90% methanol. Upon removal of this organic solvent there remains an aqueous solution containing a proportion of the AA368 antibiotic, and this is then combined with the aqueous solution containing such AA368 as was not extracted together with antifoam oils. The combined aqueous solution may then be extracted once more to yield a solution of AA368 in a volatile organic solvent, for example ethyl acetate, butyl acetate and amyl acetate, and crude solid may be obtained upon removal of the solvent, e.g., in vacuo.

The antibiotic may be separated from the whole broth without filtration if desired, by extraction with a water-immiscible solvent, such as ethyl acetate, butyl acetate or amyl acetate.

Crude AA368, which may be in the form of an oily solid, may be purified by recrystallisation from a suitable solvent, such as, for example, carbon tetrachloride and methanol mixtures, chloroform and hexane mixtures, and ethyl acetate and petroleum ether mixtures.

An alternative method of purifying crude AA368 is to submit a solution of the antibiotic to chromatography, for example on a column of alumina.

Antibiotic AA368 finds particular application in agriculture and horticulture for the control of plant fungal diseases for which purpose it may be formulated into various types of composition with the aid of suitable carriers or diluents. Examples of such compositions include particularly solutions, dispersions, water-miscible liquids, wettable powders and dusts. The antibiotic also finds use for application to fruit to prevent fungal infection developing during storage.

The following examples of the preparation and purification of AA368 are now given by way of illustration only.

EXAMPLE 1

*Fermentation to Produce AA368*

Four shake-flasks (250 ml.) each containing 60 mls. Sabouraud malt medium (2.08% oxide malt extract 4.0% glucose, 1.0% oxoid peptone) were inoculated from an agar slope and incubated at 28° C. to give good growth (2 to 3 days). 50–60 mls. of the well known vegetative inoculum was then transferred into each of two small aspirators. The contents of the aspirators were then used for inoculation of two 5 litre fermenters, using the contents of one aspirator for each 5 litre fermenter. Broth from one 5-liter fermenter after 28 log hours was selected for inoculation of the fermentation medium.

Fermentation was conducted in a 50-gallon fermenter using as the fermentation medium 3% oatflour, 1.0% light precipitated chalk, 0.75% glucose. During the fermentation the medium was maintained at 28° C. and harvesting took place at 72 hrs. The fermentation broth and extraction fractions were assayed by cup plate assay against *Cercospora melonis*.

*Extraction.*—The harvest broth was filtered at pH 6 and the filtrate discarded. The mycelium was extracted at room temperature with acetone and the acetone extract then freed from acetone by concentration in vacuo adding a little water as necessary.

The aqueous solution was extracted at neutrality with petrol. The petrol layer was then extracted with 90% methanol, and the aqueous methanol solution freed from methanol (in vacuo), the aqueous residue combined with the main aqueous solution and then extracted with ethyl acetate. The ethyl acetate extracts were dried over sodium sulphate and taken to dryness in vacuo, giving an oily solid.

EXAMPLE 2

*(a) Purification by Crystallisation*

25 mls. of carbon tetrachloride were added to 2.48 g. of crude oil solid. The oil dissolved but immediately precipitation of semi-crystalline material occurred. This material was filtered off and washed with carbon tetrachloride to give 610 mg. of almost colourless material. This solid was then dissolved in 7 mls. of hot methanol and 2 mls. of water added. On cooling, 590 mg. of needle-shaped crystals (melting point 128–132° C.) were precipitated.

Methanol/water recrystallisation alone did not seem adequate to obtain pure material. Finally, alternate recrystallisation from methanol/water and ethyl-acetate/petroleum ether were used to give pure crystalline solid, melting point=140–142° C. (uncorrected).

*(b) Purification by Chromatography*

A column was prepared with 15 g. of Woelm neutral grade 1 alumina in chloroform. 57 mg. of crude crystalline material were added in 5 mls. of chloroform. The results from the column were as follows:

RESULTS

| Fraction | Solvent | Volume, mls. | Weight (mg.) |
|---|---|---|---|
| 1 | Chloroform | 50 | 145 |
| 2 | do | 25 | 4 |
| 3 | Chloroform/ethyl acetate (1:1) | 25 | 0 |
| 4 | Ethyl acetate | 25 | 0 |
| 5 | Ethyl acetate + 5% methanol | 25 | 3 |
| 6 | do | 25 | 95 |
| 7 | do | 25 | 24 |
| 8 | Methanol | 25 | 26 |
| | | | 297 |

Fraction 6, after two recrystallisations from methanol/water gave a solid melting point=135.5–137.5° C.

EXAMPLE 3

A shake-flask containing 50 ml. of Sabouraud medium (see Example 1) was inoculated from an agar slope and incubated at 28° C. for three days. This culture was used to inoculate 3 liters of the same medium which was incubated under sterile conditions at 28° C. with stirring at a rate of 750 r.p.m. and aerated with sterile air at a rate of 6 liters per minute for 44 hours. This culture was used to inoculate a stainless steel fermenter containing 150 litres of the following medium:

|  | Percent |
|---|---|
| Oatflour | 3 |
| Calcium carbonate (pptd.) | 1 |
| Glucose | 1.5 |
| Maize oil | 0.1 | the glucose being sterilised separately. The initial pH (after sterilisation) was 7.2. The fermentation was maintained at 28° C., with stirring at 350 r.p.m. and with an air-flow of 10 c.f.m for 116 hours, when a titre of 400 $\mu$g./ml. was attained against *C. melonis*. At six hourly intervals six additions of 0.25% glucose were added (as a 50% sterile solution) after 24 hours' fermentation, making the total sugar addition 3%.

The harvest broth was filtered and the filtrate discarded. The mycelium was extracted three times with acetone, firstly with 30 litres, secondly and thirdly with 25 litres of 70% acetone. The combined extracts were evaporated under vacuum until all the acetone was removed leaving an aqueous suspension of semi-crystalline crude antibiotic. The crude material was separated by filtration, washed with petroleum (B.P. 60–80° C.) and dried under vacuum; weight 29 grams.

The crude solid was dissolved in 65 ml. of hot ethyl acetate and filtered to give a clear solution. 1.5 grams of activated charcoal were added, the solution heated and filtered. To the clear solution, whilst refluxing, 300 ml. of petroleum (B.P. 100–120° C.) were added slowly, to give a slightly turbid solution. On standing overnight at room temperature, the product separated in colourless needles which were filtered and dried in a vacuum to give 20.2 g. of purified antibiotic.

EXAMPLE 4

Two hundred litres of harvest broth produced as in Example 3 were, without filtration, extracted by stirring with 50 litres of butyl acetate. The two phases were separated by centrifugation and the butyl acetate layer concentrated under vacuum. 2.3 g. of the antibiotic separated which assayed as 84% pure. The mother liquor when poured into four volumes of petroleum gave a further 40 g. which was 43% pure. This second crop was dissolved in 175 ml. of 90% methanol and the solution extracted three times wtih 50 ml. of petroleum (B.P. 100–120° C.). The methanolic solution was evaporated to 130 ml. and whilst hot, 70 ml. of water added. On cooling 23 g. of 91% material separated as colourless needles.

EXAMPLE 5

*Preparation of 200 µg./ml. AA368 in True Solution as an Agricultural Formulation*

(a) Dissolve 400 mlg. AA368 in 5 mls. ethyleneglycol monoethyl ether (ethyl Cellosolve) to give 8% solution. Solution occurs readily at room temperature.

(b) Add 0.8 ml. Texofor F15 (Glovers Chemicals, Wortley Low Mills, Leeds 12), a non-ionic surface-active agent with octyl phenol as hydrophobic group in combination with a poly-oxyethylene chain. General formula—$RO.CH_2CH_2.(OC_2H_4)_n.OH$ where R=octylphenol.

The Texofor F15 is first liquified by warming to 47° C. and is then completely soluble in the 8% solution of AA368 in ethyl Cellosolve.

(c) The miscible formulation as prepared in (a) and (b) above is then diluted in the ratio 1 part miscible formulation to 345 parts water (containing additionally 0.04% Texofor F15).

EXAMPLE 6

10% water miscible formulation of AA368 suitable for use against apple scab (*Venturia inaequalis*).

The formulation contains:

| | |
|---|---|
| AA368 | g-- 10 |
| Texofor F15 | g-- 27.6 |
| Ethyl Cellosolve | ml-- 68 |

The formulation may be prepared in a similar manner to that described in Example 5.

We claim:

1. The antibiotic AA368 which has the molecular formula $C_{43}H_{71}O_{12}N$, has a specific rotation of $[\alpha]_D^{20}$ +114° (c., 1% in chloroform) and which is soluble in each of the solvents selected from the group consisting of butanol, ethyl acetate and chloroform, has an ultra-violet spectrum showing peaks at 280 mµ and 200 mµ, in infrared absorption spectrum with principal bands at 3450 (2.90µ), 3220 (3.11µ), 1712 (5.84µ), 1624 (6.16µ), 1466 (6.82µ), 1410 (7.09µ), 1384 (7.22µ), 1328 (7.53µ), 1274 (7.85µ), 1258 (7.95µ), 1230 (8.13µ), 1208 (8.28µ), 1174 (8.52µ), 1150 (8.70µ), 1082 (9.24µ), 1046 (9.56µ), 990 (10.10µ), 972 (10.29µ), 960 (10.42µ), 920 (10.87µ), 904 (11.06µ), 876 (11.42µ), 860 (11.63µ), 828 (12.08µ), 800 (12.50µ) and 778 cm.$^{-1}$ (12.85µ) and a melting point (uncorrected) of 140–142° C. following recrystallisation from ethyl acetate/petroleum ether (1:3 by volume).

2. A process for the production of an antibiotic designated antibiotic AA368 which comprises culturing an AA368-producing species of the genus streptomyces selected from the group consisting of Streptomyces N.C.I.B. 9198, Streptomyces N.C.I.B. 9199 and Streptomyces N.C.I.B. 9200 in the presence of a nutrient medium therefor under aerobic conditions and thereafter recovering the antibiotic thus produced from the culture broth.

3. A process as claimed in claim 2 in which the medium includes as source of nitrogen a complex organic material.

4. A process as claimed in claim 3 in which the source of nitrogen is oatmeal.

5. A process as claimed in claim 2 in which the medium contains from 0.025 to 0.3% by weight of assimilable nitrogen.

6. A process as claimed in claim 2 in which the medium includes a water soluble carbohydrate as source of carbon and energy.

7. A process as claimed in claim 6 in which said carbohydrate is a member selected from the groups consisting of dextrose and glucose.

8. A process as claimed in claim 6 in which the concentration of the carbohydrate in the medium is from 0.5% to 0.75%.

9. A process as claimed in claim 2 in which the medium further contains a glyceride oil.

10. A process as claimed in claim 9 in which said glyceride oil is selected from the group consisting of whale oil and maize oil.

11. A process as claimed in claim 9 in which said glyceride oil is present in an amount of from 0.25% to 5%.

12. A process as claimed in claim 2 in which the fermentation is effected under submerged aerobic conditions.

13. A process as claimed in claim 2 in which the fermentation medium is adjusted to a pH between 6 and 7.5 before inoculation.

14. A process as claimed in claim 13 in which the fermentation medium is adjusted to a pH of about 6.8 before inoculation.

15. A process as claimed in claim 14 in which the pH of the medium is adjusted before inoculation by the addition of chalk.

16. A process as claimed in claim 2 in which the fermentation is effected at a temperature of from 25–20° C.

17. A process as claimed in claim 16 in which the fermentation is effected at a temperature of about 28° C.

18. A process as claimed in claim 2 in which separation of the antibiotic from the fermentation broth is effected at between 96 and 160 hours from commencement.

19. A process as claimed in claim 2 in which separation of the antibiotic from the fermentation broth is effected by filtering the mycelium from the broth and extracting the antibiotic with an organic solvent therefor.

20. A process as claimed in claim 19 in which said solvent is a member selected from the group consisting of acetone, butanol, ethyl acetate, butyl acetate and amyl acetate.

21. A process as claimed in claim 19 in which an aqueous solution of the antibiotic is formed by removal of the organic solvent and the addition of water.

22. A process as claimed in claim 21 in which removal of the organic solvent is effected by concentration in vacuo.

23. A process as claimed in calim 21 in which the aqueous solution of the antibiotic is further extracted with a water-immiscivle organic solvent.

24. A process as claimed in claim 23 in which any antibiotic present in said water-immiscible organic solvent is extracted with an aqueous organic solvent for the antibiotic, the organic solvent removed to yield an aqueous solution of the antibiotic and said aqueous solution combined with the previously obtained aqueous solution of the antibiotic.

25. A process as calimed in claim 24 in which the aqueous solution of the antibiotic is extracted with a volatile organic solvent and the organic solvent removed to yield crude AA368 antibiotic.

26. A process as claimed in claim 25 in which said volatile organic solvent is a member selected from the group consisting of ethyl acetate, butyl acetate and amyl acetate.

27. A process as claimed in claim 25 in which the crude AA368 antibiotic is purified by recrystallisation from a mixture selected from the group consisting of a carbon tetrachloride and methanol mixture, a chloroform and hexane mixture, and an ethyl acetate and petroleum ether mixture.

28. A process as claimed in claim 2 in which separation of the antibiotic from the fermentation broth is effected by extraction of the whole broth with a water-immiscible solvent and removal of the solvent to yield crude AA368 antibiotic.

29. A process as claimed in calim 28 in which said water-immiscible solvent is a member selected from the group consisting of ethyl acetate, butyl acetate and amyl acetate.

30. An antifungal preparation containing the antibiotic AA368 as defined in claim 1 in association with a carrier.

References Cited in the file of this patent

Nature, 192, p. 952 (1961).